US006196958B1

(12) United States Patent
Shiraki et al.

(10) Patent No.: US 6,196,958 B1
(45) Date of Patent: Mar. 6, 2001

(54) TONER SUPPLY ROLL INCLUDING CYLINDRICAL POLYURETHANE SPONGE STRUCTURE HAVING HELICAL PROTRUSIONS ON ITS OUTER SURFACE

(75) Inventors: Keita Shiraki, Inuyama; Akihiko Kaji, Komaki, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/315,368

(22) Filed: May 18, 1999

(30) Foreign Application Priority Data

Jun. 5, 1998 (JP) ................................................ 10-157504

(51) Int. Cl.[7] ................................................ F16C 13/00

(52) U.S. Cl. ................................ 492/59; 492/18; 492/35; 492/56; 492/37; 399/281

(58) Field of Search ................................ 492/59, 30, 35, 492/37, 18, 56; 399/281, 272; 264/46.5, 46.6, 46.7, 46.9

(56) References Cited

U.S. PATENT DOCUMENTS

| | | | | |
|---|---|---|---|---|
| 3,599,306 | * | 8/1971 | Brafford | 492/30 |
| 4,399,933 | | 8/1983 | Anderson et al. . | |
| 4,566,162 | * | 1/1986 | Brands | 26/105 |
| 4,696,255 | | 9/1987 | Yano et al. | 118/653 |
| 4,766,843 | | 8/1988 | Murakami et al. . | |
| 4,788,570 | | 11/1988 | Ogata et al. | 355/3 DD |
| 5,311,264 | | 5/1994 | Kinoshita | 355/259 |
| 5,553,357 | * | 9/1996 | Kim et al. | 492/35 |
| 5,553,806 | * | 9/1996 | Lucas | 242/542.4 |
| 5,655,197 | | 8/1997 | Okada et al. | 118/661 |
| 5,768,668 | | 6/1998 | Shiraki et al. | 399/281 |
| 5,854,961 | * | 12/1998 | Wibbels et al. | 492/35 |

FOREIGN PATENT DOCUMENTS

| | | |
|---|---|---|
| 0 528 045 | 2/1993 | (EP) . |
| 0 747 781 | 12/1996 | (EP) . |
| 3-155575 | 7/1991 | (JP) . |
| 4-55873 | 2/1992 | (JP) . |
| 5-61350 | 3/1993 | (JP) . |
| 6-301281 | 10/1994 | (JP) . |

OTHER PUBLICATIONS

Patent Abstracts of Japan, vol. 1996, No. 04, Apr. 30, 1996 & JP 07 315617 A (Mitsubishi Cable Ind Ltd.), Dec. 5, 1995.
Patent Abstracts of Japan, vol. 012, No. 305 (M–733), Aug. 19, 1988 & JP 63 082710 A (Showa Electric Wire & Cable Co. Ltd.) Apr. 13, 1988 *abstract* .

* cited by examiner

*Primary Examiner*—S. Thomas Hughes
*Assistant Examiner*—Marc W. Butler
(74) *Attorney, Agent, or Firm*—Burr & Brown

(57) ABSTRACT

A toner supply roll including a cylindrical soft polyurethane sponge structure which is integrally formed on a metal shaft and which has a hardness of not higher than 350 g, a network of cells, and a skin layer having openings which are open in its outer circumferential surface and which communicate with respective radially outermost ones of the cells located adjacent to the skin layer, wherein the openings have a size of 100–800 μm, and a total area percent of at least 20% of the total area of the outer circumferential surface of the skin layer, and the sponge structure has a plurality of helical protrusions formed on the outer circumferential surface of the skin layer so as to extend helically about an axis of the sponge structure, the helical protrusions being arranged in a circumferential direction of the sponge structure, so as to form a plurality of helical recesses each interposed between adjacent ones of the helical protrusions, so that helical protrusions and recesses cooperate to define a toothed profile in transverse cross section in a plane perpendicular to the axis.

14 Claims, 7 Drawing Sheets

TONER SUPPLY ROLL INCLUDING CYLINDRICAL POLYURETHANE SPONGE STRUCTURE HAVING HELICAL PROTRUSIONS ON ITS OUTER SURFACE

BACKGROUND OF THE INVENTION

1. Field of the Invention

The present invention relates in general to a toner supply roll for transferring a toner, and more particularly to a toner supply roll incorporated in an image developing device used in an image forming apparatus such as copying apparatus, image recording apparatus, printer and facsimile, and a method suitable for producing such a toner supply roll. The image developing device is adapted to develop an electrostatic latent image into a visible image consisting of a toner or developer. The visible image is formed on a suitable image bearing medium such as a photoconductive or photosensitive medium used in electrophotography, or a dielectric medium used in electrostatic recording. The toner supply roll functions to transfer the toner to such an image bearing medium for developing the latent image into the visible image.

2. Discussion of the Related Art

In such a known copying, recording, printing, facsimile reception or other image forming apparatus, an electrostatic image formed on a photoconductive or electrostatic dielectric image-bearing medium is developed by an image developing device into a visible image by transfer of a toner to selected local spots on the imagewise exposed image-bearing medium. The image developing device has a hopper accommodating a mass of the toner (developer), and incorporates an image developing roll, and a toner supply roll which is a soft elastic roll adapted to supply the toner to the image developing roll so as to transfer the toner to the image-bearing medium.

For instance, the toner supply roll used in such an image developing device is an elastic roll of a polyurethane foam or sponge structure, as disclosed in JP-A-3-155575. Several methods have been proposed to produce or manufacture such an elastic roll. These methods include: method A including the steps of obtaining a roll by cutting a slab of a foam product generated by foaming a material in a mold, inserting a metal shaft through the roll, and grinding or polishing the circumferential surface of the roll to finish the roll into the desired shape; method B including the steps of foaming a material in a mold so as to form a cylindrical sponge structure on a metal shaft, and grinding the sponge structure to remove an unnecessary portion for thereby obtaining the toner supply roll of the desired shape; and method C wherein a sponge structure is formed on a metal shaft in the same manner as in the method B, but the grinding step is not implemented.

However, the conventional methods A, B and C of producing the elastic roll suffer from various potential problems. For example, the methods A and B include the complicated process steps, and suffer from fluffing of the surface of the roll due to the grinding step, namely, generation of undesirable burrs or fuzz left on the ground or polished surface of the roll; and unsatisfactory dimensional accuracy of the roll. Although the method C is free from such problems, this method does not permit the skin layer of the roll to have a sufficiently large thickness. The insufficient thickness of the skin layer may cause easy breakage of the skin layer due to friction resistance during use of the roll as the toner supply roll, in which the roll is held in rolling contact with an image developing roll. Thus, the method C does not assure sufficient durability of the roll.

The durability of the elastic roll produced according to the method C may be increased by: 1) increasing the density of the sponge structure and increasing the thickness of the skin layer, so as to increase the strength of the skin layer, 2) improving the physical properties (tensile strength, elongation and hardness) of the roll, or 3) employing a so-called "integral skin foam" which facilitates the formation of the skin layer. These measures, however, all result in increasing the hardness of the foam or sponge structure of the roll. Generally, the toner supply roll is required to have a high degree of flexibility as well as a high level of durability. The method C does not permit these two requirements to be satisfied simultaneously.

The elastic toner supply roll of the image developing device is required to have functions of supplying a suitably controlled amount of the toner to the image developing roll and of scratching off an unnecessary amount of the toner from the image developing roll, so that the toner is uniformly distributed on the image developing roll. The surface of the toner supply roll produced according to the known methods A and B tends to be fluffed or given burrs or fuzz, leading to instability of the amount of the toner to be transferred to the image developing roll, and resulting in deteriorated quality of an image reproduced by the toner. Further, the burrs removed from the toner supply roll may act as foreign matters which may be unfavorably left in the other portions of the image forming apparatus, resulting in the deteriorated quality of the reproduced image and malfunction of the apparatus.

The elastic toner supply roll produced according to the known method C suffers from the problem of foreign matters as indicated above with respect to the methods A and B, namely, removal of fragments of the material of the sponge structure due to breakage of the skin layer of the sponge structure as described above. Further, the toner is likely to enter the interior of the sponge structure through the broken portions of the skin layer, resulting in hardening of the broken portions, that is, local hardening of the sponge structure of the roll, which may cause instability of the amount of the toner to be transferred from the roll.

The conventionally used toner which is transferred by the toner supply roll tends to be required to have a relatively small particle size and a relatively low melting point, so as to meet demands for an improved image quality reproduced by the toner and an increased speed of printing. Such a toner is likely to be aggregated due to electrostatic charging and long-term storage thereof. Accordingly, the aggregated masses of the toner powder are likely to remain as films of the toner ("toner filming" defect) on the outer circumferential surface of the image developing roll, so that the remaining toner films cannot be sufficiently scratched off by the toner supply roll from the surface of the image developing roll, leading to occurrence of an unfavorable variation of the toner concentration or density of the reproduced image, which may cause a ghost image ("ghosting" defect). The toner supply roll is held in rolling contact with the image developing roll, and is rotated with the image developing device in the same direction. At the nip between two rolls, the toner supply roll removes the residual toner stuck to the surface of the image developing roll, while evenly transferring a new layer of the toner to the surface of the image developing roll. However, the conventional elastic toner supply roll is not sufficiently highly capable of scratching off the residual toner which is aggregated or stuck on the outer circumferential surface of the image developing roll, resulting in partial remaining of the toner on the outer circumferential surface of the image developing roll. This may cause uneven distribution of the toner on the image developing roll, resulting in a variation of the toner concentration of the reproduced image and reproduction of a ghost image.

For improving the function or capability of the toner supply roll to scratch off the residual toner stuck on the image developing roll, it may be considered to increase the hardness of the toner supply roll or to increase the contact pressure at the nip between the toner supply roll and the image developing device. Both of the proposed measures are effective to improve the scratching function of the toner supply roll, but unfavorably increase the contact pressure between the toner supply roll and the image developing roll, leading to tearing or wearing of the image developing roll, deterioration of the particles of the toner (grinding of the toner particles), and excessive electrostatic charging of the toner. Therefore, these measures may cause deterioration of the quality of the reproduced image, during long-term use of the roll, such as reduction of the toner concentration and undesirable transfer of the toner to local portions of the recording medium at which no image should be printed. It may also be considered to increase the size of cells of a sponge structure of the toner supply roll. In this case, the toner is likely to enter the inside of the sponge structure thorough the cells, resulting in hardening of the sponge structure at the local portions where the toner is entered, whereby the quality of the reproduced image may be deteriorated.

SUMMARY OF THE INVENTION

It is therefore a first object of the present invention to provide a toner supply roll which is less likely to suffer from the conventionally experienced problems of fluffing of the surface of the sponge structure, instability of transfer of the toner, and deteriorated dimensional accuracy.

It is a second object of the present invention to provide a toner supply roll which is less likely to suffer from the conventionally experienced problems of deteriorated durability and generation of foreign matters due to breakage of the skin layer of the sponge structure, and local hardening of the sponge structure due to entry of the toner inside the sponge structure.

It is a third object of the present invention to provide a toner supply roll which has a remarkably improved function of scratching off the toner remaining on the outer circumferential surface of the image developing roll.

At least one of the first, second and third objects indicated above may be achieved according to the principle of the present invention, which provides a toner supply roll comprising: a metal shaft; and a cylindrical soft polyurethane sponge structure integrally formed on an outer circumferential surface of the metal shaft, and wherein the cylindrical soft polyurethane sponge structure having a hardness of not higher than 350 g, and includes a skin layer, the sponge structure having a network of cells, and the skin layer having an outer circumferential surface and openings which are open in the outer circumferential surface and which communicate with respective radially outermost ones of the cells which are located adjacent to the outer circumferential surface of the skin layer, each of the openings having a size within a range of 100–800 $\mu$m, and a total area of the openings being at least 20% of a total area of the outer circumferential surface of the skin layer, and the sponge structure having a plurality of helical protrusions formed on the outer circumferential surface of the skin layer so as to extend helically about an axis of the sponge structure, the helical protrusions being arranged in a circumferential direction of the sponge structure, so as to form a plurality of helical recesses each of which is interposed between adjacent ones of the helical protrusions, the plurality of helical protrusions and the plurality of helical recesses cooperating to define a toothed profile in transverse cross section in a plane perpendicular to the axis.

In the toner supply roll of the present invention constructed as described above, the cylindrical soft polyurethane sponge structure is formed on the outer circumferential surface of the metal shaft. The skin layer has a generally continuous smooth surface, although the openings communicating with the radially outermost cells are formed through the skin layer. Since the present toner supply roll is not subjected to such a grinding or polishing process as performed in the conventional method, the outer circumferential surface of the skin layer of the soft polyurethane sponge layer of the present toner supply roll will not be fluffed with burrs or fuzz, which would cause an unstable transfer of the toner from the roll to an image developing roll. The present toner supply roll is therefore less likely to suffer from or is free from the deterioration of the quality of the reproduced image and malfunctioning of an image forming apparatus due to the removal of the burrs as foreign matters. Further, the present toner supply roll has improved dimensional accuracy in the absence of the fluffing of the sponge structure.

Further, the toner supply roll constructed as described above according to this invention has the plurality of helical protrusions formed on the outer circumferential surface of the skin layer so as to extend helically about the axis of the sponge structure, so that a recess is interposed between adjacent ones of the helical protrusions, so that the helical protrusions and recesses are arranged alternately in the circumferential direction of the sponge structure, so as to cooperate to define a toothed profile in transverse cross section taken in a plane perpendicular to the axis of the cylindrical soft polyurethane sponge structure. In use, the toner supply roll whose outer circumferential surface has the helical protrusions and recesses is held in rolling contact with the image developing roll under a suitable pressure, so that the toner which remains on the outer circumferential surface of the image developing roll is effectively scratched off by the toner supply roll in the presence of the helical protrusions and the recesses. Further, the toner removed from the image developing roll and carried by the toner supply roll can be effectively removed from the toner supply roll, owing to the helical extension of the helical protrusions and recesses. Thus, the conventionally experienced problem of variation of the toner concentration of the reproduced image due to the toner remaining on the image developing roll is effectively eliminated.

In addition, the toner supply roll of the present invention is characterized by the openings which are formed through the outer surface of the skin layer and open to the atmosphere. In the absence of those openings, those portions of the skin layer at which the radially outermost cells are located would be thinned in the presence of these radially outermost cells located adjacent to the outer surface of the skin layer. Namely, the openings which are open in the outer surface of the skin layer and communicate with the radially outermost cells adjacent to the skin layer make it possible to eliminate those portions of the skin layer which are thinned in the presence of the radially outermost cells in the conventional toner supply roll. In the present toner supply roll, the skin layer will not be broken or ruptured during use in an image forming apparatus, leading to improved durability of the toner supply roll, and elimination of fluffing of the skin layer which would cause burrs to be left as foreign matters in the image forming apparatus, as encountered in the conventional toner supply roll. Further, since the openings are open in the surface of the skin layer and communicate with the radially outermost cells, the toner is likely to enter the inside of the sponge structure through the openings, with even distribution of the toner throughout the sponge structure, and can be relatively easily discharged or removed from the sponge structure, whereby the sponge structure is less likely to suffer from local hardening, which is conventionally experienced due to the local breakage of the skin layer and consequent entry and stay of the toner through and within the broken portions of the skin layer.

Preferably, the cylindrical soft polyurethane sponge structure is integrally formed on the outer circumferential surface of the metal shaft, by foam molding of a polyurethane material in a mold cavity having an inner surface which is shaped to define the toothed profile of the plurality of helical protrusions and the plurality of helical recesses.

In one preferred form of the present invention, each of the plurality of helical protrusions has a helix angle of 11–74° with respect to the axis of the cylindrical soft polyurethane sponge structure. Preferably, the helix angle is selected within a range of 30–74°.

In another preferred form of the invention, each of the plurality of helical protrusions has a height of 0.1–1.0 mm, and a top width of 0.2–1.0 mm, and the plurality of helical protrusions are arranged in the circumferential direction of the cylindrical soft polyurethane sponge structure with a pitch of 0.6–2.0 mm. Preferably, the height is within a range of 0.2–0.5 mm, and the top width is selected within a range of 0.2–0.5 mm, while the pitch is selected within a range of 0.8–1.5 mm.

In a further preferred form of the invention, the size of each of the openings is selected within a range of 200–700 $\mu$m.

In a still further preferred form of the invention, the total area of the openings is not larger than 70% of the total area of the outer circumferential surface of the skin layer.

In a yet further preferred form of the invention, each of the cells has a size of 100–1000 $\mu$m, preferably, within a range of 300–900 $\mu$m.

BRIEF DESCRIPTION OF THE DRAWINGS

The above and other objects, features and advantages of this invention will be better understood by reading the following detailed description of a presently preferred embodiment of the invention, when considered in connection with the accompanying drawings, in which:

FIG. 5(*b*) is a fragmentary enlarged view in cross section of the soft polyurethane sponge structure, which is taken along line B—B of FIG. 3(*a*);

DETAILED DESCRIPTION OF THE PREFERRED EMBODIMENTS

Figure 1:
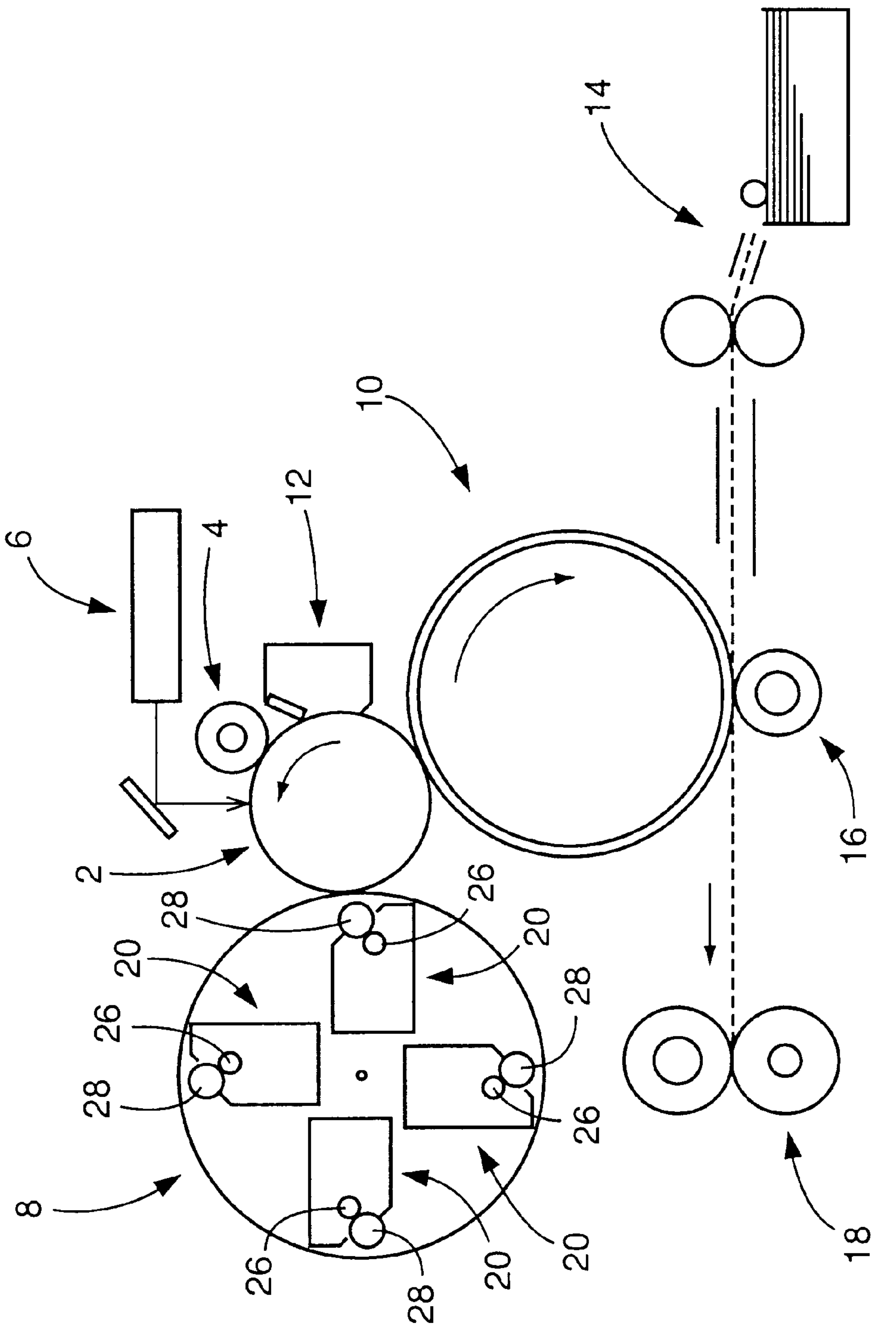
FIG. 1 is a schematic elevational view illustrating a construction of a full-color laser printer using toner supply rolls according to one embodiment of the present invention.

Referring first to FIG. 1, there is schematically shown a full-color laser printer wherein four toner supply rolls each constructed according to a first embodiment of the present invention are used. The laser printer illustrated in FIG. 1 is equipped with a photosensitive drum 2. Around this photosensitive drum 2, there are arranged a charging roll 4, a laser scanner 6, an image developing device 8, an image transferring drum 10 and a cleaning device 12. A surface of the photosensitive drum 2 is electrostatically charged by the charging roll 4. The laser scanner 6 is adapted to generate a modulated laser beam as image information, which imagewise exposes the surface of the photosensitive drum 2 so as to form an electrostatic latent image corresponding to the image information. The image developing device 8 is provided to apply a powdered toner to imagewise electrostatically charged surface area of the photosensitive drum 2, for thereby forming a visible image which consists of the toner. The visible toner image is transferred from the surface of the photosensitive drum 2 onto a surface of the image transferring drum 10. The cleaning device 12 is adapted to clean up the photosensitive drum 10, that is, to remove residual toner image or residual toner powder, which remains on the surface of the photosensitive drum 2. The toner image transferred onto the transferring drum 10 is further transferred onto a recording surface of a sheet of recording paper, which is fed from a paper supply 14, along a feed path which passes a nip between the image transferring drum 10 and a pinch roll 16. The toner image transferred onto the recording surface of the sheet is fixed by an image fixing device 18.

The present laser beam printer is adapted to effect full-color printing, that is, the image developing device 8 consists of four developing units 20, which accommodate four kinds of color toners i.e., cyan, yellow, magenta and black toners, respectively. As each color toner, a non-magnetic one-component developer may be employed. The four developing units 20 are disposed around an axis of rotation of the developing device 8 such that the four units 20 are equally spaced from each other at an angular interval of 90°. Thus, the photosensitive drum 2 is adapted to contact with each of the developing units 20 each time the developing device 8 is rotated by 90° about its axis, whereby the drum 2 is provided with the four color toners (color developers), so that the latent image formed on the photosensitive drum 2 is developed into a visible color image.

Figure 2:
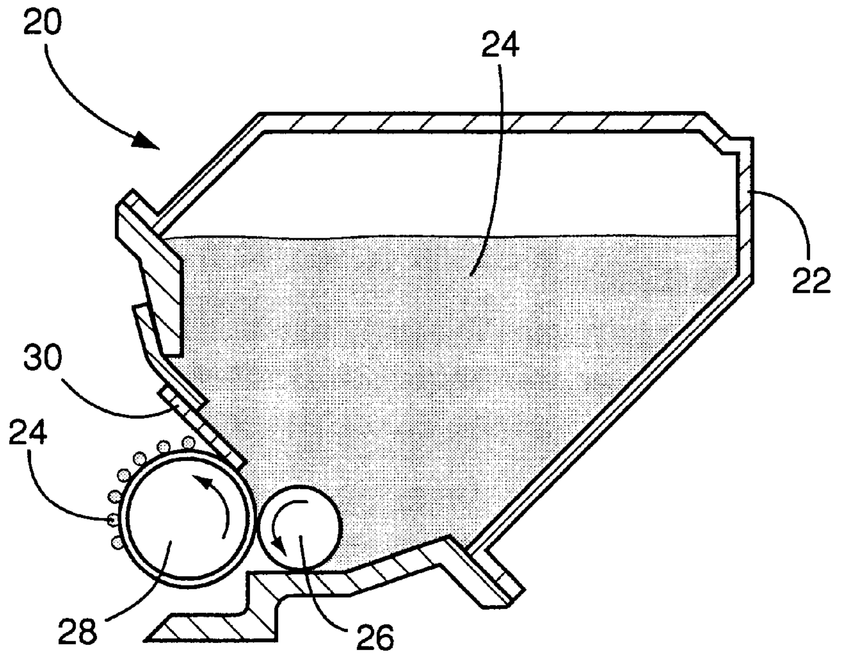
FIG. 2 is an enlarged view in cross section of one of developing units of the laser printer of FIG. 1.

As is clearly shown in FIG. 2, each developing unit 20 of the image developing device 8 comprises a hopper 22 in which a mass of powdered toner 24 as a color developer (non-magnetic one-component developer) is contained. The developing unit 20 further comprises a toner supply roll 26 and a developing roll 28 which are disposed in the lower portion of the hopper 22 such that the toner supply roll 26 and the image developing roll 28 are held in rolling contact with each other under a predetermined pressure and are adapted to rotate in the same direction. As the two rolls are rotated in the same direction (counterclockwise direction as indicated by arrows in FIG. 2), the toner supply roll 26 removes residual toner powder which remains on the outer circumferential surface of the image developing roll 28, while applying or transferring the toner 24 contained in the hopper 22 to the outer circumferential surface of the image developing roll 28, so that a toner layer is formed on a portion of the outer circumferential surface of the developing roll 28, which portion goes away from the nip between the developing roll and the toner supply roll 26. Adjacent the developing roll 28 and relatively near the nip of the rolls 26, 28, there is disposed a toner-layer forming blade 30 by which the thickness of the toner layer formed on the developing roll 28 is suitably regulated. As is apparent from the above description, the surface of the developing roll 28 of each developing unit 20 is brought into contact with the circumferential surface of the photosensitive drum 2 when the developing device 8 is rotated by 90°, so that the powdered toner of the toner layer formed on the developing roll 28 is transferred onto the surface of the photosensitive drum 2, so that the electrostatic latent image formed on the photosensitive drum 2 is developed.

The present invention relates to the toner supply roll 26 used in each developing unit 20 of the developing device 8 which is provided on the laser printer constructed as described above. The toner supply roll 26 includes a center metal shaft and a cylindrical soft polyurethane sponge structure which is integrally formed on the metal shaft by a foam molding. As described below in detail, the polyurethane sponge structure has a skin layer providing an outer circumferential surface of the structure, and a multiplicity of cells formed therein. The cells include the cells which are exposed in the outer circumferential surface of the polyurethane sponge structure through openings formed through the skin layer. The polyurethane sponge structure is further characterized in that a plurality of protrusions are formed on the outer circumferential surface of the sponge structure so as to extend helically about the axis of the toner supply roll 26, so that the outer circumferential surface of the polyurethane sponge structure is also provided with a plurality of helical recesses which are interposed between adjacent ones of the helical protrusions. One example of the toner supply roll 26 according to the first embodiment of the present invention is shown in FIGS. 3(*a*) and 5.

Figure 3A:
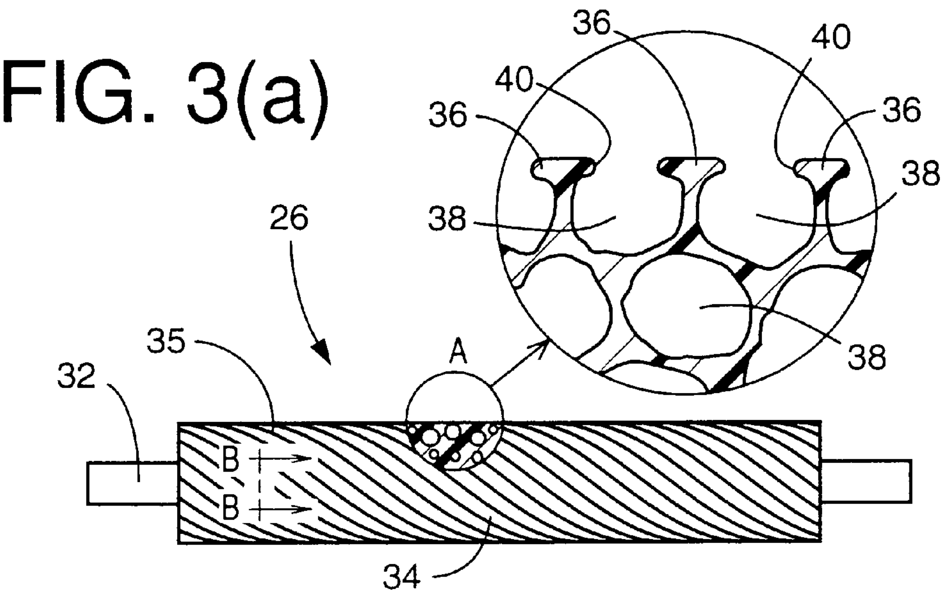
FIG. 3(*a*) is an enlarged view in cross section of a part of a toner supply roll according to the present invention, and FIG. 3(*b*) and FIG. 3(*c*) are enlarged cross sectional views which respectively show examples of known toner supply rolls produced according to conventional methods.
Figure 3B:
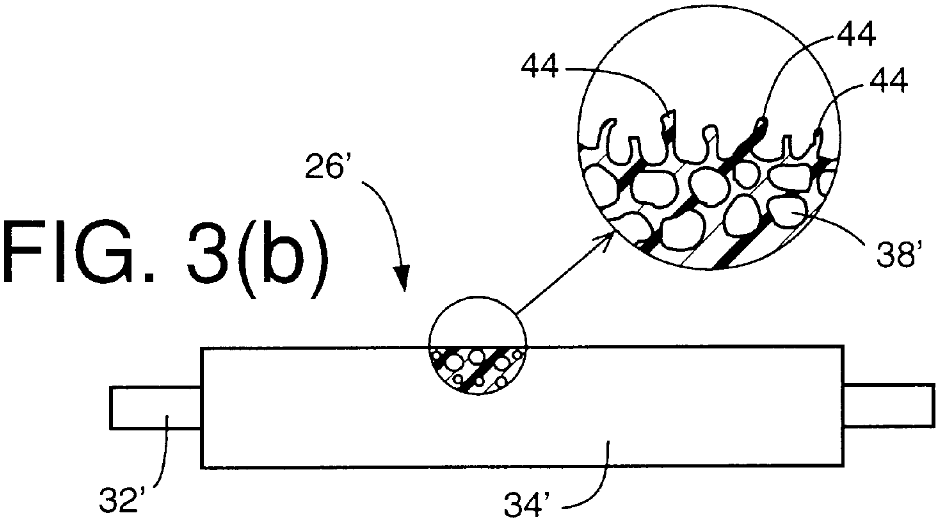
Figure 3C:
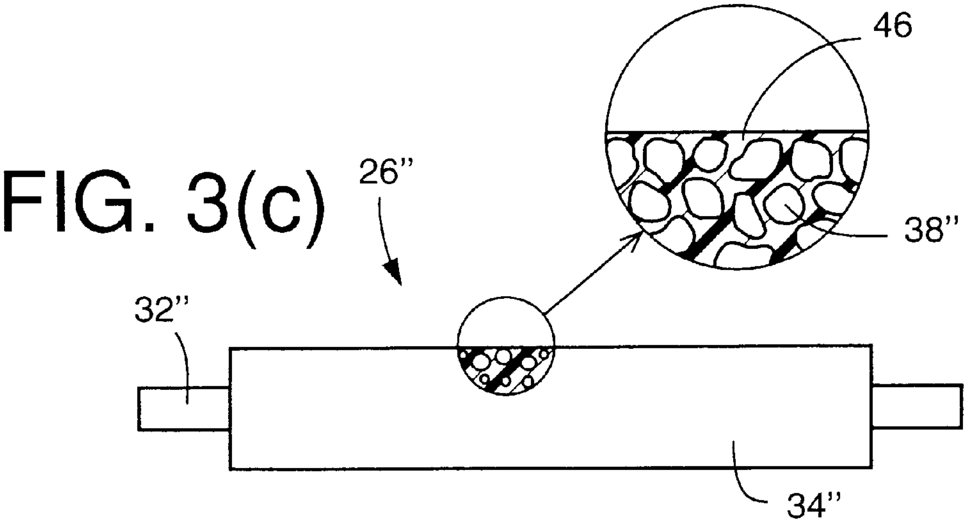

As shown in FIG. 3(*a*), the toner supply roll 26 consists of a metal shaft 32 which has an axis of rotation, and a cylindrical soft polyurethane sponge structure 34 of independent-cell or closed-cell type which is formed on and integrally with the metal shaft 32. The toner supply roll 26 constructed as described above, may be prepared by suitably positioning the metal shaft 32 in a mold and injecting a polyurethane material into a mold cavity whose configuration corresponds to a desired shape of the toner supply roll 26. In this arrangement, the polyurethane sponge structure 34 having a hardness of not higher than 350 g is formed on and integrally with the metal shaft 32, with a desired wall thickness.

As shown in the enlarged view of FIG. 3(*a*), the soft polyurethane sponge structure 34 formed on the metal shaft 32 has a skin layer 36 having an outer circumferential surface, and a multiplicity of cells 38 formed therein. Through the outer surface of the skin layer 36, there are formed a multiplicity of openings 40 which communicate with respective radially outermost ones of the cells 38 that are formed and located adjacent to the skin layer 36, so that those radially outermost cells 38 are open in the outer surface of the skin layer 36 (sponge structure 34) through the openings 40. Each opening 40 has a diameter of 100–800 μm. Thus, the skin layer 36 is made porous with the cells 38 and the openings 40. Each opening 40 is formed in a portion of the skin layer 36 which is located at a central portion of the corresponding radially outermost cell 38 as seen in the axial and circumferential directions of the cylindrical sponge structure 34. If the openings 40 were not formed, the skin layer 36 would have the smallest thickness at the central portions of those radially outermost cells 38. This arrangement eliminate the conventionally provided thin portions of the skin layer adjacent to the enclosed radially outermost cells. The thus formed porous skin layer 36 having the openings 40 is free from the conventionally experienced problem of local breakage at its portions adjacent to the radially outermost cells during use of the toner supply roll, which breakage would generate foreign substances that may enter the interior of the polyurethane sponge structure 34, namely, into the opened cells.

Figure 4A:
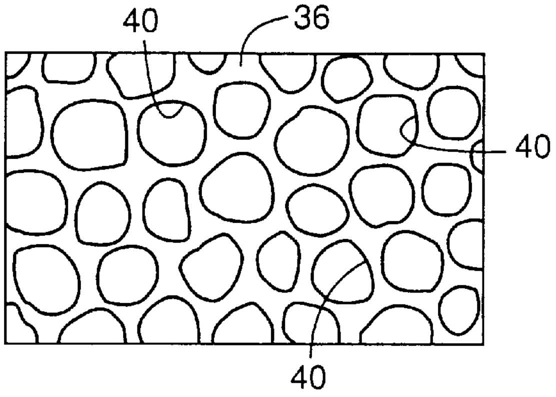
FIGS. 4(*a*), 4(*b*), and 4(*c*) are enlarged views showing surfaces of skin layers of soft polyurethane sponge structures in three examples of the toner supply roll constructed according to the present invention, wherein openings in the skin layers have different diameters.
Figure 4B:
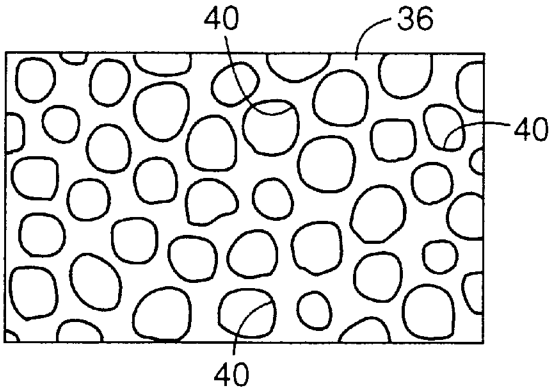
Figure 4C:
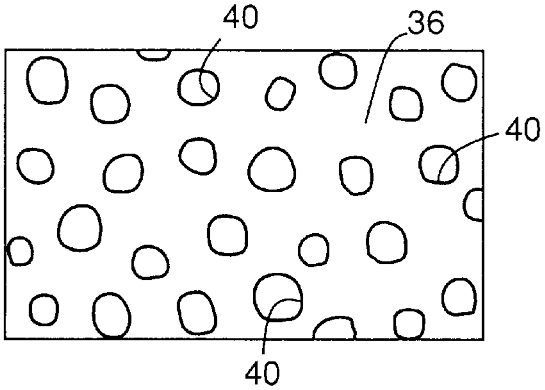

Referring next to the enlarged plane view of FIGS. 4(*a*), 4(*b*) and 4(*c*), there are shown three examples of the skin layers 36, wherein the openings 40 have different sizes or diameters. As clearly shown in these views, the skin layers 36 in all of the three examples have generally smooth or continuous outer surfaces, although the smoothness or continuity of the surfaces more or less changes depending on the size of the openings 40. The skin layer 36 in each of the three examples is formed such that the total area of the openings 40 formed in the outer circumferential surface of the skin layer 36 is at leased 20% of the total surface area of the skin layer 36 (including the areas of the openings 40). This arrangement is effective to eliminate or reduce the portions of the skin layer 36 which would be thinned by the enclosed radially outermost cells 38 adjacent to the outer surface of the skin layer 36. The present arrangement of the openings 40 is also effective to permit uniform flows of the powdered toner into and out of the radially outermost open cells 38 of the polyurethane sponge structure 34, thereby preventing local hardening of the polyurethane sponge structure 34. If the percent of the total area of the openings 40 to the total surface area of the skin layer 38 were lower than 20%, the toner supply capacity of the toner supply roll 26 would be insufficient, and the polyurethane sponge structure 34 would tend to be clogged with the toner. The portion of the polyurethane sponge structure 34 clogged with the powdered toner suffers from excessively high hardness, resulting in deterioration of the quality of an image reproduced by the laser printer. The upper limit of the area percent of the openings 40 with respect to the total area of the skin layer 36 is 80%, and more preferably 70%.

In the toner supply roll 26 constructed according to the first embodiment of the present invention, the openings 40 of the radially outermost cells 38 located adjacent to the surface of the skin layer 36 of the polyurethane sponge structure 34 has a generally circular shape as seen in FIGS. 4(*a*), 4(*b*) and 4(*c*). For excellent performance of the toner supply roll 26, the openings 40 are dimensioned such that the diameter of the openings 40 is held within a range of 100–800 μm, preferably, 200–700 μm. If the diameter of the openings 40 were smaller than the lower limit of 100 μm, the powdered toner once admitted into the radially outermost cells 38 through the openings 40 would tend to be hardly discharged from the radially outermost cells 38, resulting in local hardening of the polyurethane sponge structure 34, and undesirable deterioration of the quality of the reproduced image. If the diameter of the openings 40 were larger than the upper limit of 800 μm, an amount of the toner supplied from the toner supply roll 26 to the developing roll 28 would be unfavorably reduced, also resulting in the image quality deterioration due to reduction of the toner concentration and failure of printing at local portions of the reproduced image.

The soft polyurethane sponge structure 34 may be an independent-cell or closed-cell type cellular structure as described above wherein the cells 38 do not communicate with each other, or a continuous-cell or mutually communicating type structure wherein the cells 38 communicate with each other. Preferably, the polyurethane sponge structure 34 is of the independent cell-type. The diameter of the cells 38 formed in the soft polyurethane sponge structure 34 of the toner supply roll 26 according to the first embodiment of the present invention is larger than the diameter of the openings 40. The diameter of the cells 38 is generally 100–1000 μm, and preferably 300–900 μm. If the cell diameter is excessively small (smaller than 100 μm), the diameter of the openings 40 is accordingly reduced, leading to the problem of local clogging of the polyurethane sponge structure 34 with the toner, resulting in local hardening of the toner supply roll 26. If the cell diameter is excessively large, the powdered toner can easily enter the polyurethane sponge structure 34, also leading to significant hardening of the toner supply roll 26, resulting in deterioration of the reproduced image.

Figure 5A:
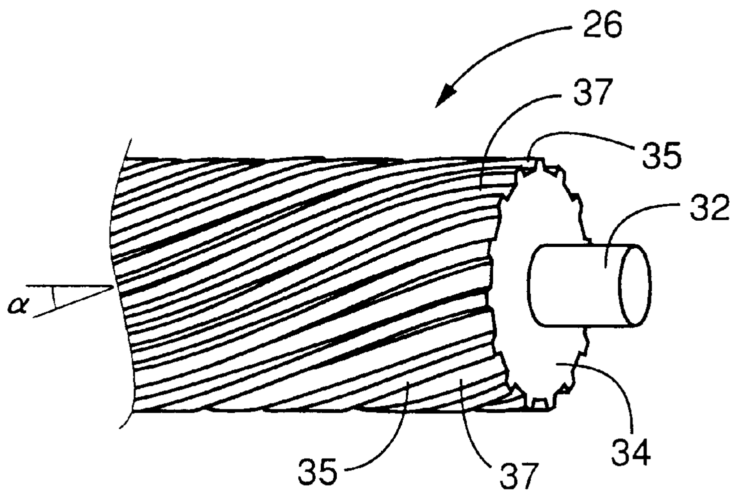
FIG. 5(*a*) is a fragmentary enlarged perspective view of the toner supply roll of FIG. 3(*a*)
Figure 5B:
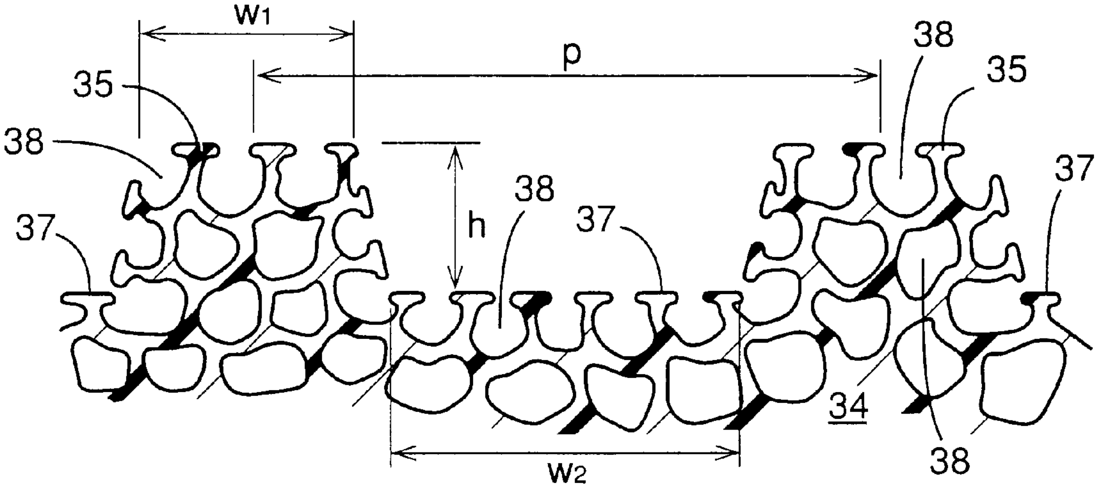

Referring next to the fragmentary enlarged perspective view of FIG. 5(*a*) and the fragmentary cross sectional view of 5(*b*), a plurality of helical protrusions 35 are formed on the outer circumferential surface of the polyurethane sponge structure 34 of the toner supply roll 26 according to the present invention. The helical protrusions 35 extend helically about the axis of the toner supply roll 26 (axis of the metal shaft 32), so as to define helical recesses 37, each of which is interposed between the adjacent helical protrusions 35 in the circumferential direction of the sponge structure 34. That is, the helical protrusions 35 and the helical recesses 37 are formed alternately in the circumferential direction of the sponge structure 34. The helical protrusions 35 have a height (h) within a range of 0.1–1.0 mm, preferably, 0.2–0.5 mm, and a top width (w1) within a range of 0.2–1.0 mm, preferably, 0.2–0.5 mm, and are arranged in the circumferential direction of the polyurethane sponge structure 34 with a pitch (p) of 0.6–2.0 mm, preferably, 0.8–1.5 mm. The width (w1) is a width of each helical protrusion 35 as measured at its top or upper surface.

If the values of height (h), width (w1) and pitch (p) of the helical protrusions 35 are smaller than the respective lower limits of 0.1 mm, 0.2 mm and 0.6 mm, the toner supply roll 26 suffers from deterioration of its function of scratching off the residual toner 24 remaining on the outer circumferential surface of the developing roll 28. If the height (h) of the protrusions 35 is larger than the upper limit of 1.0 mm, the helical protrusions 35 at which the toner supply roll 26 is held in pressing contact with the image developing roll 28, tend to be deformed due to the pressure at the nip, while the color laser printer is not in operation, leading to deterioration of the reproduced image. If the pitch (p) of the protrusions 35 is larger than the upper limit of 2.0 mm, a frictional force generated between the toner supply roll 26 and the image developing roll 28 is lowered at the helical recesses 37 interposed between the adjacent helical protrusions 35. Accordingly, the thickness of the toner layer formed on the image developing roll 28 is reduced at the local portions of the roll 28 which contact with the respective helical recesses 37, whereby the thickness of toner layer formed on the outer surface of the image developing roll 28 varies in the form of stripes, resulting in a variation of the toner concentration of the reproduced image. If the width (w1) is larger than the upper limit of 1.0 mm, the total width dimension of the helical recesses 37 as measured in the circumferential direction of the toner supply roll 26 is reduced, resulting in insufficient capability of the recesses 37 to transfer the toner from the hopper 22 onto the image developing roll 28.

The helical protrusions 35 are formed helically about the axis of the toner supply roll 26, at a suitably selected helix angle (α) with respect to the axis of the toner supply roll 26. The helix angle (α) of the helical protrusions 35 with respect to the axis of the toner supply roll 26 is generally selected within a range of 11–74°, and preferably within a range of 30–74°. If the helix angle (α) is smaller than 11°, an appreciable improvement of the function of the helical protrusions 35 of scratching off the residual toner 24 remaining on the outer circumferential surface of the developing roll 28 is not expected. If the helix angle (α) is larger than 74°, an appreciable improvement of the above-indicated function is not expected.

Each of the helical protrusions 35 formed on the outer circumferential surface of the polyurethane sponge structure 34 has a suitable rectangular or trapezoidal shape in cross section in a plane perpendicular to the axis of the toner supply roll 26, as indicated in FIG. 5(*b*). The shape of each helical recess 37 in the transverse cross section is determined by the shape of each helical protrusion 35, or vice versa. In this specific example of FIG. 5(*b*), the helical protrusions 35 and the helical recesses 37 cooperate to define a toothed profile in transverse cross section in a plane perpendicular to the axis of the sponge structure 34. Generally, each of the helical recesses 37 has a bottom width (w2) of 0.2–0.8 mm as measured at its bottom in the circumferential direction of the polyurethane sponge structure 34.

Figure 6A:
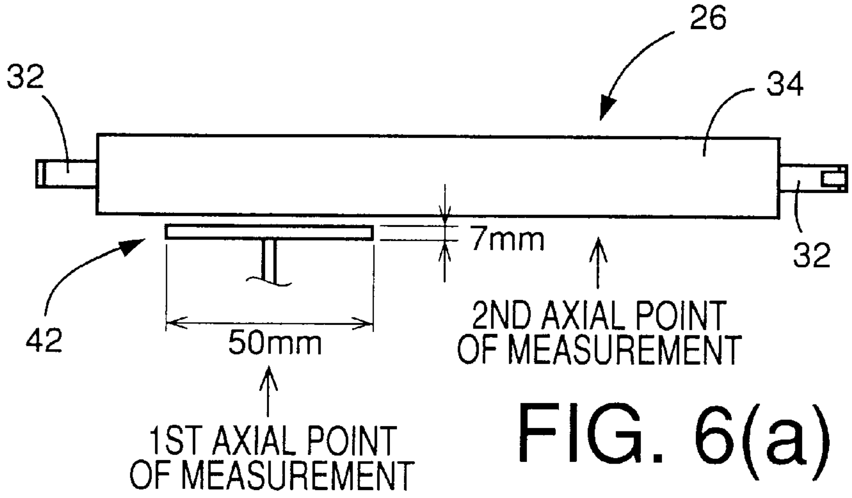
FIGS. 6(*a*) and 6(*b*) are respectively a plane view and an end view of the toner supply roll according to the present invention, both of which illustrate a method of measuring the hardness of the soft polyurethane sponge structure of the toner supply roll.
Figure 6B:
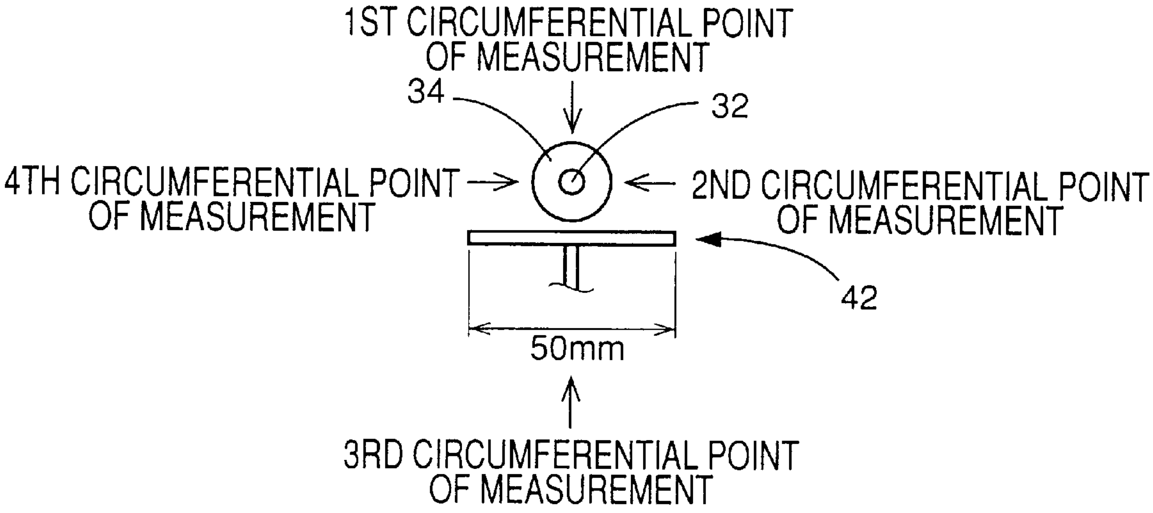

Further, the soft polyurethane sponge structure 34 of the toner supply roll 26 constructed according to the present embodiment of the invention is required to have a hardness of 350 g or lower. If the hardness of the toner supply roll 26 exceeds the upper limit of 350 g, the function of the roll 26 to supply the toner 24 to the developing roll 28 is deteriorated, so that the image reproduced on the developing roll 28 is deteriorated. This deterioration can be confirmed by a test operation on the laser printer using the toner supply roll 26 under a low-temperature and low-humidity condition, namely at 15° C. and under 10% humidity. The hardness of the toner supply roll 26 as described above is measured in a manner as shown in FIGS. 6(*a*) and 6(*b*). Namely, the toner roll 26 is supported at the opposite axial ends of the metal shaft 32, as illustrated in FIGS. 6(*a*) and 6(*b*). A part of the polyurethane sponge structure 34 of the toner supply roll 26 is pressed at a rate of 10 mm/min, by a jig 42 including a presser plate which has a thickness of 7 mm. The presser plate is a rectangular plate having a dimension of 50 mm as measured in the axial direction of the toner supply roll 26 as indicated in FIG. 6(*a*), and a dimension of 50 mm as measured in the diametric direction of the roll 26 as indicated in FIG. 6(*b*). A load (g) is applied to the surface of the sponge structure 34 in the radial direction to cause radial displacement of 1 mm of the sponge structure 34. This load (in gram) which has caused the 1 mm radial displacement represents the hardness of the sponge structure 34. The hardness of the polyurethane sponge structure 34 increases with an increase of the applied load (g). As is apparent from FIGS. 6(*a*) and 6(*b*), the applied load (g) is measured at two axial points of the toner supply roll 26 which are spaced apart from each other by a suitable distance in the axial direction, and at four circumferential points of the toner supply roll 26 which are equally spaced apart from each other at an angular interval of 90°. Thus, the load applied to the toner supply roll 26 is measured at a total of eight points. An average of the eight load values measured represents the hardness of toner supply roll 26. The soft polyurethane sponge structure 34 having the hardness of not higher than 350 g as described above may be easily obtained by selecting the composition of the soft polyurethane material and the amount of the material injected into the mold. Especially, the polyurethane sponge structure 34 having a desired hardness corresponding to the specific amount of the material can be obtained by using a mold which employs a pipe as described below.

The skin layer 36 and the adjacent cellular structure of the toner supply roll 26 as shown in FIG. 3(*a*) according to the present invention is distinguished from the surface structures of the known toner supply rolls formed according to the conventional methods as described above, which are shown in FIGS. 3(*b*) and 3(*c*).

Namely, the toner supply roll 26' shown in FIG. 3(*b*) is formed according to the conventional method (A) or (B) described above, wherein the polyurethane sponge structure 34' formed on the metal shaft 32' is subjected to a grinding or polishing operation on its surface, so that the ground or polished surface of the polyurethane sponge structure 34' is fluffed with burrs or fuzz 44. The burrs 44 may be peeled off from the surface of the polyurethane structure 34' during use of the toner supply roll 26'. The removed burrs 44 may be left as foreign matters in the laser printer, and may lower the dimensional accuracy of the toner supply roll 26'. Referring next to FIG. 3(*c*), the toner supply roll 26" shown therein is formed according to the conventional method (C) described above, wherein the polyurethane sponge structure 34" is formed around the metal shaft 32". On the surface of the polyurethane sponge structure 34", there is formed a skin layer 46 as indicated in enlargement FIG. 3(*c*). In the toner supply roll 26", cells 38" located adjacent to the outer surface of the skin layer 46 are not open in the outer surface, so that the thickness of the skin layer 46 is reduced at portions thereof right above the cells 38". Thus, the thinned portions of the skin layer 46 tend to be easily broken or torn, causing fragments of the skin layer 46 to be removed as foreign substances. Further, through the thus opened portions of the skin layer 46, the toner may enter the inside of the polyurethane sponge structure 34, resulting in local hardening of sponge structure 34".

In the toner supply roll 26 according to the first embodiment of the present invention as shown in FIG. 3(*a*), the skin layer 36 provides a generally continuous and smooth outer circumferential surface of the polyurethane sponge structure 34. The skin layer 36 assures improved dimensional accuracy of the toner supply roll 26. Further, the skin layer 36 has the openings 40 communicating with the radially outermost cells 38. Since the openings 40 are located at the portions of the skin layer 36 which are aligned with the central portions of the radially outermost cells 38 in the axial and circumferential directions of the cylindrical sponge structure 34 (metal shaft 32), the skin layer 36 does not have the thinned portions as provided in the skin layer 36 of the conventional roll 26" of FIG. 3(*c*). Thus, the present toner supply roll 26 effectively eliminates the conventional problems of fluffing on the outer circumferential surface of the toner supply roll 26 and removal of burrs 44 from the surface of the toner supply roll 26, and removal of fragments of the skin layer 34. Further, the local hardening of the sponge structure 34 is not caused, since the toner 24 does not enter the cellular portion of the sponge structure 34 wherein the radially inner cells 38 do not communicate with the radially outermost cells 38 that are open in the surface of the skin layer 36.

In the toner supply roll 26 according to the present embodiment of this invention, moreover, the plurality of the helical protrusions 35 each having the predetermined height (h) are formed on the outer circumferential surface of the polyurethane sponge structure 34 so as to extend helically about the axis of the sponge structure 34, namely,26, and are arranged in the circumferential direction of the polyurethane sponge structure 34 with the predetermined pitch (p), so that the outer circumferential surface of the polyurethane sponge structure 34 is provided with the plurality of alternate helical protrusions 35 and recesses 37. The toner supply roll 26 whose outer circumferential surface has the helical protrusions 35 and recesses 37 is in rolling contact with the image developing roll 28 and is rotated with the developing roll 28 in the same direction, whereby the residual amount of the toner 24 remaining on the outer circumferential surface of the image developing roll 28 is effectively scratched off or removed by the helical protrusions 35 and recesses 37 of the toner supply roll 26. Further, the helical configuration of the helical protrusions 35 and recesses 37 facilitate the removal of the toner from the toner supply roll 26. Since the remaining toner 24 is effectively removed from the outer circumferential surface of the image developing roll 28, the toner supply roll 26 can evenly transfer the toner 24 from the hopper 22 onto the cleaned outer circumferential surface of the image developing roll 28, such that the toner layer formed on the image developing roll 28 has a desired constant thickness over the entire surface. Thus, the present toner supply roll 26 does not suffer from the conventionally experienced problem of variation of the toner concentration of the reproduced image.

The toner supply roll 26 constructed according to the present embodiment of the invention may be easily produced according to various methods known in the art. For effectively producing the toner supply roll 26 of the first embodiment of the present invention, the following method of production may be employed. According to this method of producing the toner supply roll 26, the soft polyurethane sponge structure 34 is formed by simple foam molding of the polyurethane material, such that the openings 40 are formed through the skin layer 36, so that the radially outermost cells 38 adjacent the skin layer 36 are open to the atmosphere through the openings 40, and such that the plurality of helical protrusions 35 are formed on the outer circumferential surface so as to extend helically about the axis of the sponge structure 34, and are arranged in the circumferential direction of the sponge structure 34 with the predetermined pitch, so that the outer circumferential surface of the polyurethane sponge structure 34 are provided with the helical protrusions 35 and the helical recesses 37.

Namely, according to the present method of producing the toner supply roll 26 by foam molding of a polyurethane material in a mold cavity of a mold, the mold cavity has a configuration corresponding to a desired shape of the sponge structure 34. The mold is prepared such that a plurality of helical grooves which correspond to the plurality of helical protrusions 35 are formed in an inner surface of the mold, so that the thus grooved inner surface of the mold defines the outer circumferential surface of the sponge structure 34 having the helical protrusions 35 and recesses 37. The inner surface of the mold is processed to have a surface roughness of Rz 5–20 μm, and so as to be covered by a coating layer formed of a mold releasing agent of a silicone resin type or fluororesin type, for example. Then, the foam-molding of the polyurethane material is executed in the mold as follows. Namely, the metal shaft 32 is suitably positioned in place in the mold cavity, and then the polyurethane material is introduced into the mold cavity. The polyurethane material is foamed in the mold, so that the soft polyurethane sponge structure 34 is formed on the outer circumferential surface of the metal shaft 32, such that the skin layer 36 is formed so as to provide the outer circumferential surface of the polyurethane sponge structure 34. The skin layer 36 has the openings 40 which are formed through the skin layer 36 at respective portions of the skin layer 36, through which the radially outermost cells 38 located adjacent to the outer surface of the skin layer 36 are open to the atmosphere. Moreover, the outer circumferential surface of the polyurethane sponge structure 34 is provided with the plurality of helical protrusions 35 each extending helically about the axis of the sponge structure 34, by transfer of a shape of the helical grooves formed in the inner surface of the mold to the outer circumferential surface of the sponge structure 34.

When the polyurethane material in a liquid state is foamed in the mold constructed as described above, the coating layer of the mold releasing agent formed on the inner surface of the mold (i.e., the inner circumferential surface of the mold cavity which defines the configuration of the outer circumferential surface of the polyurethane sponge structure 34) performs a function to form the openings 40. That is, the formed layer of the mold releasing agent exhibits water repellency and surface tension with respect to the polyurethane material. Further, the roughness (Rz) of the inner surface of the mold is suitably adjusted to a desired value within the range specified above. As a result, the polyurethane material is absent in those areas of the mold cavity surface which correspond to the portions of the skin layer 36 that are adjacent to the radially outermost cells 38 to be formed in the polyurethane sponge structure 34, namely, absent in those areas of the mold cavity surface which correspond to the portions of the skin layer 36 that are aligned with the center portions of the radially outermost cells 38 and which would otherwise be thinned. Thus, the openings 40 are formed through the skin layer 36 of the polyurethane sponge structure 34, so that the radially outermost cells 38 are open in the surface of the skin layer 36. Moreover, the inner surface of the mold cavity, which defines the outer circumferential surface of the polyurethane sponge structure 34, is provided with the grooves each of which extends helically about the axis of the mold, so that the obtained toner supply roll 26 is provided with the helical protrusions 35 formed on the outer circumferential surface so as to extend helically about the axis of the toner supply roll 26.

In the present method of producing the toner supply roll 26, the helical grooves are formed in the inner surface of the mold so as to extend helically about the axis of the mold. The mold defines the configuration of the outer circumferential surface of the polyurethane sponge structure 34. That is, the formed helical grooves provide the outer circumferential surface of the toner supply roll 26 with the plurality of helical protrusions 35 and recesses 37. The inner surface of the mold is subjected to a suitable roughing process as well known in the art, such as shot blasting, such that the inner surface of the mold has the surface roughness (Rz) of 5–20 μm. If the surface roughness (Rz) of the inner surface of the mold is smaller than the lower limit of 5 μm, the openings 40 formed in the skin layer 36 of the polyurethane sponge structure 34 do not have a sufficiently large size. On the other hand, if the surface roughness (Rz) of the inner surface of the mold exceeds the upper limit of 20 μm, the obtained toner supply roll 26 cannot be easily removed from the mold, without breakage or tearing of the skin layer 36 and breakage or damage of the sponge structure 34.

For forming the helical grooves corresponding to the helical protrusions 35 in the inner surface of the mold cavity, various methods known in the art may be employed. To obtain the desired inner surface of the mold cavity, the mold may be processed by etching, electric discharge machining (wire cutting), helical broaching or the like, for example. The mold may also be subjected to an electro-forming or casting so that the desired shape is effectively transferred to the inner surface of the mold. Alternatively, the mold for foam molding of the polyurethane sponge structure 34 may consist of two halves of a pipe, each of which has a semi-circular transverse cross sectional shape and which are welded or butted together. The semi-circular inner surfaces of these two halves are subjected to electric discharge machining using electrodes which have a helical shape corresponding to the shape of the helical grooves to be formed in the inner surfaces.

The above-mentioned method further comprises the step of forming the coating layer of the mold releasing agent on the inner surface of the mold which have been processed to have the specific configuration corresponding to the outer circumferential surface of the desired toner supply roll 26 and to have a roughness (Rz) of 5–20 μm. The coating layer may be formed of any mold releasing agent which is well known in the art. Preferably, a releasing agent of silicone resin type or fluororesin type, namely, a releasing agent including modified silicone, fluororesin or modified fluororesin, as a major component, may be used. Generally, the coating layer has a thickness of about 1–10 μm. If the thickness of the coating layer is smaller than the lower limit of 1 μm, the coating layer cannot function as desired. If the thickness of the coating layer is larger than the upper limit of 10 μm, the surface condition of the polyurethane sponge structure 34 foamed in the mold is deteriorated. The mold releasing agent of silicone resin type or fluororesin type is applied to the inner surface of the mold and is then preferably cured by heat, so that the strength of the coating layer is effectively increased.

As the mold used in the present method described above, a mold using a pipe as shown in FIGS. 7(*a*) and 7(*b*), namely, so-called a pipe type mold is preferably used. The inner surface of the pipe partly defines the mold cavity corresponding to the specific configuration of the soft polyurethane sponge structure 34 of the toner supply roll 26.

Figure 7A:
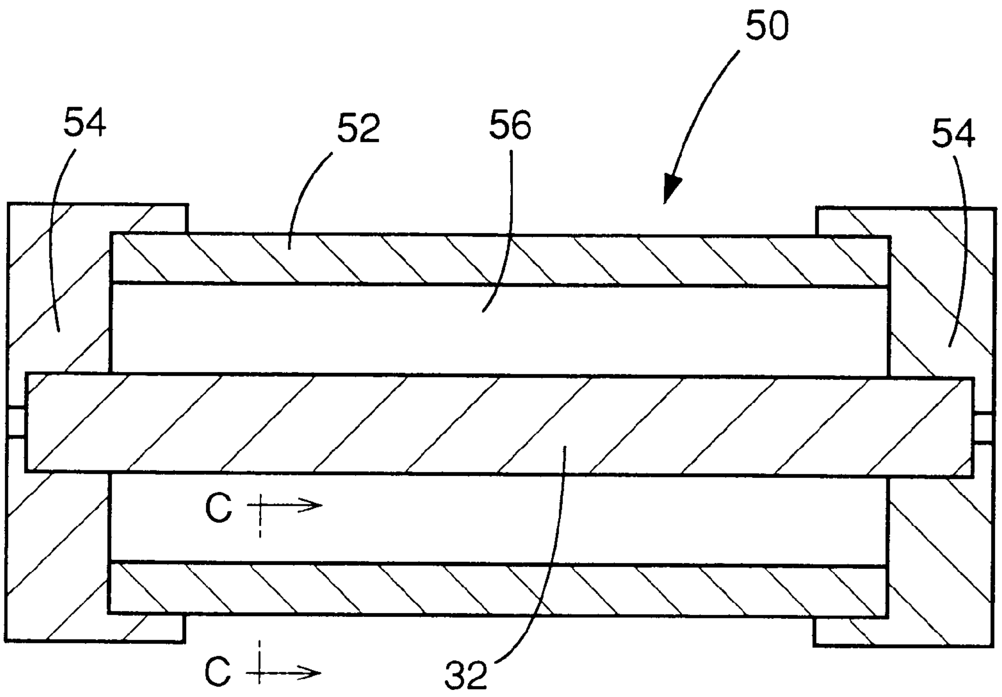
FIGS. 7(*a*) and 7(*b*) are respectively a longitudinal cross sectional view and a fragmentary enlarged cross sectional view of one example of a mold which is used to produce the toner supply toll of the present invention, the fragmentary enlarged cross sectional view of FIG. 7(*b*) being taken along line C—C of FIG. 7(*a*).
Figure 7B:
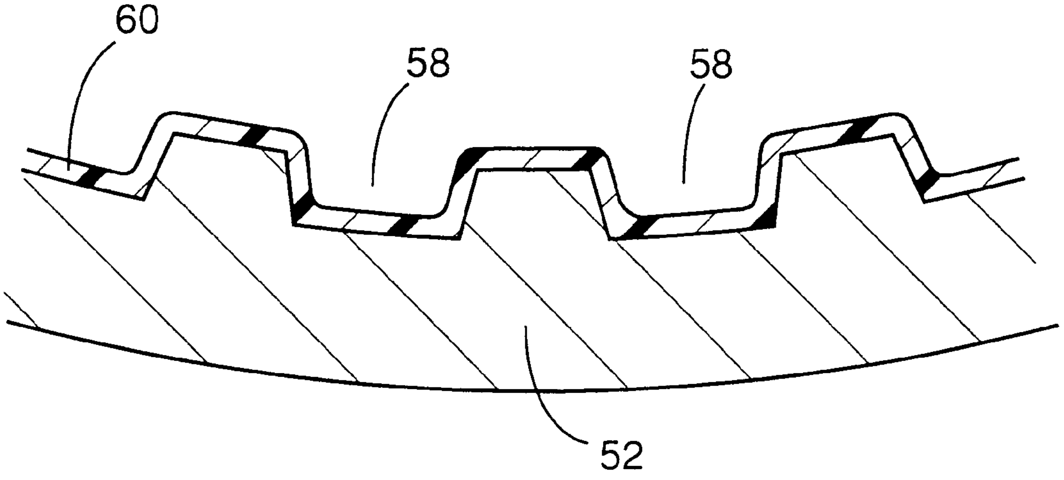

Referring to FIG. 7(*a*), there is shown a mold 50 which comprises a pipe 52 the axial length of which is equal to that of the soft polyurethane sponge structure 34, and a pair of end caps 54, 54 which are fixed to the opposite axial open ends of the pipe 52, respectively so as to close these open ends. The metal shaft 32 is disposed inside the pipe 52 and is supported at its axial ends by the pair of end caps 54, 54, respectively, such that the metal shaft 32 is coaxial with the pipe 52. Thus, a desired mold cavity 56 is defined by the pipe 52, metal shaft 32 and end caps 54. This mold cavity 56 is adapted to form the sponge structure 34 having the desired configuration (outside diameter and shape) and axial length.

Referring next to the enlarged view of FIG. 7(*b*), there is shown a part of the inner surface of the pipe 52 of the mold 50. In the inner surface of the pipe 52, there are formed helical grooves 58, which correspond to the helical protrusions 35 formed on the outer circumferential surface of the desired toner supply roll 26, so as to extend helically about the axis of the pipe 52. The inner surface of the pipe 52 is processed to have the predetermined roughness (Rz). A coating layer 60 which consists of a mold releasing agent of silicone resin type or fluororesin type is formed on the inner surface of the pipe 52 with the predetermined thickness.

In the method of producing the toner supply roll, the soft polyurethane sponge structure 34 is formed by foam-molding of the polyurethane material in the mold cavity 56 of the mold 50. The polyurethane material is introduced into the mold cavity 56, in a liquid state, as in the conventional method, and may be selected preferably from known groups of reactive materials such as a mixture of polyol and polyisocyanate, which are foamed and cured in the mold.

More specifically described, the polyol component of the liquid polyurethane material may be any one of polyols selected from the group consisting of polyether polyol, polyester polyol, polymer polyol, and the like, which are conventionally used in the art to make a soft polyurethane foam in general. The polyisocyanate component, on the other hand, may be any one of polyisocyanates having at least two functional groups as well known in the art. More specifically, the polyisocyanate component may preferably include at least one of 2,4- and 2,6-tolylenediisocyanate (TDI), orthtoluidinediisocyanate (TODI), naphthylenediisocyanate (NDI), xylenediisocyanate (XDI), 4,4'-diphenylmethanediisocyanate (MDI), MDI modified by carbodiimide, polymethylene polyphenylisocyanate, polymeric polyisocyanate, and the like. Any one of these polyisocyanate components may be used alone, or any combination of these components may be used.

To the polyurethane material including the polyol and polyisocyanate components, there may be added a cross-linking agent, a foaming agent (e.g., water, a substance having a low boiling point, or a gas), a bubble-controlling agent, a surface active agent, a catalyst, or the like, to provide a reactive foamable composition which is suitable to obtain the desired polyurethane sponge structure 34 by foaming, namely, the sponge structure having a network of cells which are independent of each other. The reactive foamable composition may further comprise a fire retardant and/or a filler as needed, and may further comprise an electrically conductive additive and/or an antistatic agent, as used in the conventional method. The electrically conductive additive is used to give the desired electrical conductivity to the toner supply roll.

The liquid polyurethane material is injected into the mold cavity 56 of the mold 50 as shown in FIG. 7(*a*), and then the material is foamed as in the conventional method. In this case, the starting polyurethane material is generally expanded by about 5–20 times. The material thus foamed in the mold cavity 56 gives the soft polyurethane sponge structure 34 formed on the metal shaft 32 such that the hardness of the polyurethane sponge structure 34 is 350 g or lower, each opening 40 has the diameter of 100–800 $\mu$m, and the total area of the openings 40 is at least 20% of the total surface area of the skin layer 36, while the outer circumferential surface of the sponge structure 34 is formed with the helical protrusions 35 and the helical recesses 37 which are formed so as to extend helically about the axis of the sponge structure 34. The obtained toner supply roll 26 removed from the mold 50 is provided with the skin layer 36 having the mutually independent openings 40 which are open in the surface of the skin layer 36 and which communicate with the radially outermost cells 38 located adjacent to the surface of the skin layer 36. The openings 40 are given the suitable size owing to the properties of the inner surface of the mold 50, i.e., the inner surface of the pipe 52, as described above. The formed polyurethane sponge structure 34 may preferably be processed by crushing with compressed air having a suitable pressure being blown against the surface of the polyurethane sponge structure 34. For forming the independent-cell type polyurethane sponge structure 34, it is desirable that the polyurethane material be mechanically foamed. In the crushing process, it is desirable to use compressed air having a relatively low pressure.

In the present embodiment of the invention, the toner supply roll 26 as obtained by foaming the polyurethane material in the mold can be used as a component of each developing unit 20. Thus, the cumbersome procedure such as a grinding step which is required in the conventional method may be eliminated according to the present embodiment. Thus, the toner supply roll may be easily produced according to the present embodiment. Moreover, the toner supply roll 26 according to the present embodiment has improved dimensional accuracy and is free from the burrs or fuzz formed on the surface of the toner roll 26, breakage of the skin layer 36, and removal of fragments from the sponge structure 34. The toner supply roll 26 has an improved function of scratching off the residual toner from the outer circumferential surface of the image developing roll 28.

EXAMPLES

There will be next described in detail preferred examples of the present invention, to further clarify the principle of the present invention. It is to be understood that the invention is not limited to the details of the following examples, but may be embodied, with various changes, modifications and improvements, which may occur to those skilled in the art, without departing from the spirit of the present invention.

Initially, several kinds of the pipe type mold (50) as shown in FIG. 7(*a*) were prepared such that the inner surfaces of the pipes (52) made of metal are subjected to helical broaching so that the inner surfaces of the respective pipes (52) are provided with respective helical grooves (58) which have different helix angles ($\alpha$). The helical grooves (58) correspond to the plurality of helical protrusions (35) which are provided on the outer circumferential surface of the polyurethane sponge structure (34) so as to extend helically about the axis of the sponge structure (34), so that the outer circumferential surface of the polyurethane sponge structure (34) has the helical protrusions (35) and the helical recesses (37) interposed between adjacent ones of the helical protrusions (35), as shown in FIGS. 5(*a*) and 5(*b*). The inner surface of each of the pipe type molds (50) which have been broached was processed by shot blasting so as to have the surface roughness (Rz) of 10 $\mu$m. The inner surface of the each pipe type mold (50) was then coated with a mold releasing agent of silicone resin type which is a solution including a modified silicone resin as a major component and 3–5% of solid content, and then heated to cured the mold releasing agent. There were obtained various kinds of pipe type molds (50) the inner surfaces of which are provided with respective kinds of helical grooves (58) having different helix angles ($\alpha$) and are covered by a cured coating layer of the mold releasing agent of silicone resin type having a thickness of 5 $\mu$m.

A desired polyurethane composition was prepared by mixing the following components in the following mixing proportion: 90 parts by weight of FA-718 that is polyether polyol (OH value=28) available from SANYO CHEMICAL INDUSTRIES, LTD., JAPAN; 10 parts by weight of POP- 31-28 that is polymer polyol (OH value=28) available from MITSUI TOATSU CHEMICALS INC., JAPAN; 0.5 parts by weight of KAOLIZER No. 1 that is tertiary amine catalyst available from KAO CORPORATION, JAPAN; 0.05 parts by weight of TOYOCAT HX-35 that is tertiary amine catalyst available from TOSOH CORPORATION, JAPAN; 2 parts by weight of water; 2 parts by weight of SZ-1313 that is a bubble-controlling agent of silicone type available from NIPPON UNICAR KABUSHIKI KAISHA, JAPAN; 8.8 parts by weight of SUMIDUR 44V-20 that is a crude MDI (NCO %=31) available from SUMITOMO BAYER URETHANE KABUSHIKI KAISHA, JAPAN; and 20.5 parts by weight of TDI-80 that is TDI (NCO %=48) available from MITSUI TOATSU CHEMICALS INC.

The prepared polyurethane composition was then foamed in the conventional manner in the prepared molds (50) whose pipes (52) are provided with the helical grooves (58) of different helix angles, whereby various kinds of toner supply rolls (26) were obtained, each having the soft polyurethane sponge structure (34) formed on the metal shaft (32). The sponge structure has a plurality of helical protrusions (35) and a plurality of helical recesses (37) on the outer circumferential surface. Each of the polyurethane sponge structure (34) of the various kinds of the toner supply rolls (26) has a hardness of 190 g, and the cells (38) have a size of 390–700 $\mu$m, while the openings (40) have a size of 330–620 $\mu$m. The total area of the openings (40) is 63.7% of the total area of the skin layer 36. The helical protrusions (35) formed on the of the polyurethane sponge structures (34) of all the obtained toner supply rolls (26) have a height (h) of 0.3 mm, a top width (w1) of 0.5 mm, and a pitch (p) of 1.3 mm in the circumferential direction of the structure (34). These specifications (h, w1, p) and the different helix angles ($\alpha$) of the helical protrusions (35) of the toner supply rolls (26) are indicated in TABLE 1.

The obtained toner supply rolls (26) were used for performing copying operations to reproduce images. The reproduced images were examined to check the generation of a "ghosting" defect and a "toner filming"defect, under copying conditions I and II. In the copying condition I, a toner consisting of spherical particles was used. In the copying condition II, a milled toner consisting of particles of irregular shapes was used. Results of the examination are indicated in TABLE 2.

The examination to check the generation of the toner filming defect was conducted by incorporating each toner supply roll (26) in a toner cartridge installed in a copying machine or copier commercially available. Copying operations of the copier were performed at 15° C. and under 10% humidity. Initially, an original image having a 7% black area was reproduced on 2000 sheets of paper, and an original image having a 100% black area was then reproduced. Immediately after the reproduction of the full 100% black image, a halftone original image was reproduced on a sheet of paper. The reproduced halftone image was examined to check if a toner filming appeared on the sheet of paper at a pitch determined by the diameter of the image developing roll also incorporated in the toner cartridge. In TABLE 2, "A" indicates that no toner filming defect was found on the reproduced halftone image at all, while "IF" indicates that the toner filming defect was extremely serious. The seriousness of the toner filming defect increases in the order of A, B, C, D, E and F.

The examination to check the generation of the ghosting defect was conducted also at 15° C. and under 10% humidity. Initially, the original image having the 7% black area was reproduced on 2000 sheets of paper, and an original image for the ghosting defect examination was reproduced on a sheet of paper to check if a ghost image appeared on the sheet of paper. In TABLE 2, "A" indicates that no ghosting defect was found at all, while "F" indicates that the ghosting defect was extremely serious. The seriousness of the ghosting defect increases in the order of A, B, C, D, E and F.

As is apparent from TABLE 1 and TABLE 2, all of the specimen Nos. 1–8 according to the the present invention exhibited an excellent toner scratching performance, that is, exhibited excellent results in terms of the ghosting and toner filming defects, even in the copying condition I in which the residual toner is less likely removed from the image developing roll than in the copying condition II. On the other hand. On the other hand, the comparative specimen No. 9 wherein the toner supply roll has a round outer circumferential surface, and the comparative specimen No. 10 wherein the toner supply roll does not have any protrusions (35) on the surface of the soft polyurethane sponge structure (34), exhibited an unacceptable toner scratching performance, that is, suffered from an extremely serious ghosting defect and a serious toner filming defect. Further, the specimen No. 11 wherein the protrusions formed on the sponge structure extend linearly in the axial direction of the toner supply roll, exhibited a toner scratching performance which is lower than that of the specimen Nos. 1–8 according to the present invention, that is, unacceptable results in terms of the ghosting and toner filming defects.

TABLE 1

SPECIFICATION OF HELICAL PROTRUSIONS

| SPECIMEN NO. | HEIGHT (h) mm | WIDTH (w1) mm | PITCH (p) mm | HELIX ANGLE ($\alpha$) mm |
|---|---|---|---|---|
| 1 | 0.3 | 0.5 | 1.3 | 82 |
| 2 | 0.3 | 0.5 | 1.3 | 74 |
| 3 | 0.3 | 0.5 | 1.3 | 66 |
| 4 | 0.3 | 0.5 | 1.3 | 49 |
| 5 | 0.3 | 0.5 | 1.3 | 30 |
| 6 | 0.3 | 0.5 | 1.3 | 16 |
| 7 | 0.3 | 0.5 | 1.3 | 11 |
| 8 | 0.3 | 0.5 | 1.3 | 9 |
| 9 | Roll with ground surface | | | — |
| 10 | Roll without protrusions | | | — |
| | 0.3 | 0.5 | 1.3 | 0 |

TABLE 2

RESULTS OF EXAMINATION

| | Copying Condition I | | Copying Condition II | |
|---|---|---|---|---|
| SPECIMEN NO. | Ghosting Defect | Toner Filming Defect | Ghosting Defect | Toner Filming Defect |
| 1 | C | D | B | C |
| 2 | B | B | A | B |
| 3 | A | B | A | B |
| 4 | A | B | A | B |
| 5 | B | B | A | B |
| 6 | C | B | A | B |
| 7 | C | B | A | B |
| 8 | C | C | B | B |
| 9 | E | F | F | F |
| 10 | D | F | C | E |
| 11 | C | C | B | B |

What is claimed is:

1. A toner supply roll comprising:

a metal shaft; and a cylindrical soft polyurethane sponge structure integrally formed on an outer circumferential surface of said metal shaft, said cylindrical soft polyurethane sponge structure having a hardness of not higher than 350 g, and including a skin layer, said sponge structure having a network of cells, and said skin layer having an outer circumferential surface and openings which are open in said outer circumferential surface and which communicate with respective radially outermost ones of said cells which are located adjacent to said outer circumferential surface of said skin layer, each of said openings having a size within a range of 100–800 μm, and a total area of said openings being at least 20% of a total area of said outer circumferential surface of said skin layer, and said sponge structure having a plurality of helical protrusions formed on said outer circumferential surface of said skin layer so as to extend helically about an axis of said sponge structure, said helical protrusions being arranged in a circumferential direction of said sponge structure, so as to form a plurality of helical recesses each of which is interposed between adjacent ones of said helical protrusions, said plurality of helical protrusions and said plurality of helical recesses cooperating to define a toothed profile in transverse cross section in a plane perpendicular to said axis.

2. A toner supply roll according to claim 1, wherein each of said plurality of helical protrusions has a helix angle of 11–74° with respect to said axis of said cylindrical soft polyurethane sponge structure.

3. A toner supply roll according to claim 2, wherein said helix angle is within a range of 30–74°.

4. A toner supply roll according to claim 1, wherein each of said plurality of helical protrusions has a height of 0.1–1.0 mm, and a top width of 0.2–1.0 mm, and said plurality of helical protrusions are arranged in said circumferential direction of said cylindrical soft polyurethane sponge structure with a pitch of 0.6–2.0 mm.

5. A toner supply roll according to claim 4, wherein said height is within a range of 0.2–0.5 mm.

6. A toner supply roll according to claim 4, wherein said top width is within a range of 0.2–0.5 mm.

7. A toner supply roll according to claim 4, wherein said pitch is within a range of 0.8–1.5 mm.

8. A toner supply roll according to claim 1, wherein said size of said each of said openings is within a range of 200–700 μm.

9. A toner supply roll according to claim 1, wherein said total area of said openings is not larger than 70% of said total area of said outer circumferential surface of said skin layer.

10. A toner supply roll according to claim 1, wherein each of said cells has a size of 100–1000 μm.

11. A toner supply roll according to claim 10, wherein said size of said each cell is within a range of 300–900 μm.

12. A toner supply roll according to claim 1, wherein said cylindrical soft polyurethane sponge structure is integrally formed on said outer circumferential surface of said metal shaft, by foam molding of a polyurethane material in a mold cavity having an inner surf ace which is shaped to define said toothed profile of said plurality of helical protrusions and said plurality of helical recesses.

13. A toner supply roll comprising:

a metal shaft; and a cylindrical soft polyurethane sponge structure integrally formed on an outer circumferential surface of said metal shaft, said cylindrical soft polyurethane sponge structure having a hardness of not higher than 350 g, and including a skin layer, said sponge structure having a network of cells, and said skin layer having an outer circumferential surface and openings which are open in said outer circumferential surface and which communicate with respective radially outermost ones of said cells which are located adjacent to said outer circumferential surface of said skin layer, each of said openings having a size within a range of 100–800 μm, and a total area of said openings being at least 20% of a total area of said outer circumferential surface of said skin layer, and said sponge structure having a plurality of helical protrusions formed on said outer circumferential surface of said skin layer so as to extend helically about an axis of said sponge structure, said helical protrusions being arranged in a circumferential direction of said sponge structure, so as to form a plurality of helical recesses each of which is interposed between adjacent ones of said helical protrusions, said plurality of helical protrusions and said plurality of helical recesses cooperating to define a toothed profile in transverse cross section in a plane perpendicular to said axis, wherein each of said helical protrusions extends from one end of said roll to the other end thereof.

14. A toner supply roll comprising:

a metal shaft; and a cylindrical soft polyurethane sponge structure integrally formed on an outer circumferential surface of said metal shaft, said cylindrical soft polyurethane sponge structure having a hardness of not higher than 350 g, and including a skin layer, said sponge structure having a network of cells, and said skin layer having an outer circumferential surface and openings which are open in said outer circumferential surface and which communicate with respective radially outermost ones of said cells which are located adjacent to said outer circumferential surface of said skin layer, each of said openings having a size within a range of 100–800 μm, and a total area of said openings being at least 20% of a total area of said outer circumferential surface of said skin layer, and said sponge structure having a plurality of helical protrusions formed on said outer circumferential surface of said skin layer across a length of said cylindrical soft polyurethane sponge structure so as to extend helically about an axis of said sponge structure, so as to form a plurality of helical recesses each of which is interposed between adjacent ones of said helical protrusions, said plurality of helical protrusions and said plurality of helical recesses cooperating to define a toothed profile in transverse cross section in a plane perpendicular to said axis.

* * * * *